(12) United States Patent
Nakayama et al.

(10) Patent No.: US 11,973,386 B2
(45) Date of Patent: Apr. 30, 2024

(54) ROTARY ELECTRIC MACHINE AND METHOD OF MANUFACTURING ROTARY ELECTRIC MACHINE

(71) Applicant: HITACHI AUTOMOTIVE SYSTEMS, LTD., Hitachinaka (JP)

(72) Inventors: Kenji Nakayama, Hitachinaka (JP); Ryoji Kobayashi, Hitachinaka (JP); Yuichiro Baba, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 727 days.

(21) Appl. No.: 17/056,830

(22) PCT Filed: Mar. 29, 2019

(86) PCT No.: PCT/JP2019/013965
§ 371 (c)(1),
(2) Date: Nov. 19, 2020

(87) PCT Pub. No.: WO2019/225156
PCT Pub. Date: Nov. 28, 2019

(65) Prior Publication Data
US 2021/0203204 A1    Jul. 1, 2021

(30) Foreign Application Priority Data
May 23, 2018    (JP) ................................ 2018-099159

(51) Int. Cl.
| | |
|---|---|
| *H02K 3/34* | (2006.01) |
| *H02K 3/28* | (2006.01) |
| *H02K 15/10* | (2006.01) |

(52) U.S. Cl.
CPC ................. *H02K 3/34* (2013.01); *H02K 3/28* (2013.01); *H02K 15/105* (2013.01)

(58) Field of Classification Search
CPC ........ H02K 15/12; H02K 3/34; H02K 15/105; H02K 15/10; H02K 3/28; H02K 3/30; H02K 3/12
(Continued)

(56) References Cited

U.S. PATENT DOCUMENTS 6,717,316 B2 *   4/2004   Asao ...................... H02K 1/165
                                                                29/598
6,873,081 B2 *   3/2005   Arai ....................... H02K 1/165
                                                                310/215
(Continued)

FOREIGN PATENT DOCUMENTS

| CN | 205693453 U | 11/2016 |
|---|---|---|
| JP | S55-8243 A | 1/1980 |

(Continued)

OTHER PUBLICATIONS

Translation of foreign patent document CN 205693453 U (Year: 2016).*

(Continued)

*Primary Examiner* — Alex W Mok
(74) *Attorney, Agent, or Firm* — Foley & Lardner LLP

(57) ABSTRACT

Since the shape of the insulating paper is complicated, a forming and bending step of the insulating paper is required, and further there is a step of inserting the insulating paper in the middle of coil forming, which causes a problem of damaging the insulating paper.
A fitting state of an insulating paper 201 into the inter-coil gap has an annular taper shape in which a diameter dimension D1 of an annular opening of the insulating paper 201 on a coil end tip side is long, and a diameter dimension d2 of an annular opening of the insulating paper 201 on a stator end face side on the opposite side is short. The insulating paper 201 is made to follow the tapered shape of the inter-coil gap 140 between an inner peripheral coil 120 and (Continued)

an outer peripheral coil 130, and the insulating paper 201 is fitted in a state inclined from the coil end tip side to the stator end face side with respect to an axial direction of the stator 20. Therefore, bending after the insertion of the insulating paper 201 is reduced, the force of the insulating paper 201 trying to come off to the coil end tip side is suppressed, and it is possible to obtain the effect of preventing the floating and the coming off of the insulating paper 201.

6 Claims, 15 Drawing Sheets

(58) Field of Classification Search
USPC .......................................................... 310/208
See application file for complete search history.

(56) References Cited

U.S. PATENT DOCUMENTS

| 9,705,374 | B2* | 7/2017 | Hino | H02K 3/12 |
| 9,735,641 | B2* | 8/2017 | Sakaue | H02K 15/105 |
| 9,906,086 | B2* | 2/2018 | Nakayama | B23K 10/02 |
| 2015/0222155 | A1* | 8/2015 | Nakayama | B23K 9/167 |
| | | | | 29/596 |
| 2018/0083496 | A1* | 3/2018 | Honjo | H02K 1/04 |

FOREIGN PATENT DOCUMENTS

| JP | S57-46644 A | 3/1982 |
| JP | S60-22435 A | 2/1985 |
| JP | 2003-219591 A | 7/2003 |
| JP | 2005-110492 A | 4/2005 |
| JP | 2011-15480 A | 1/2011 |
| JP | 2012-34453 A | 2/2012 |
| JP | 2013-121297 A | 6/2013 |

OTHER PUBLICATIONS

Translation of foreign patent document JP 2013121297 A (Year: 2013).*
Translation of foreign patent document JP 2012034453 A (Year: 2012).*
Translation of foreign patent document JP 60022435 A (Year: 1985).*
Translation of foreign patent document JP 57046644 A (Year: 1982).*
Office Action issued in corresponding Chinese Application No. 201980024934.X with English machine translation dated Nov. 9, 2022 (12 pages).
International Search Report with English translation and Written Opinion issued in corresponding application No. PCT/JP2019/013965 dated Jul. 16, 2019.
Office Action issued in corresponding Japanese Patent Application No. 2020-521064 dated Sep. 14, 2021 with English machine translation.

* cited by examiner

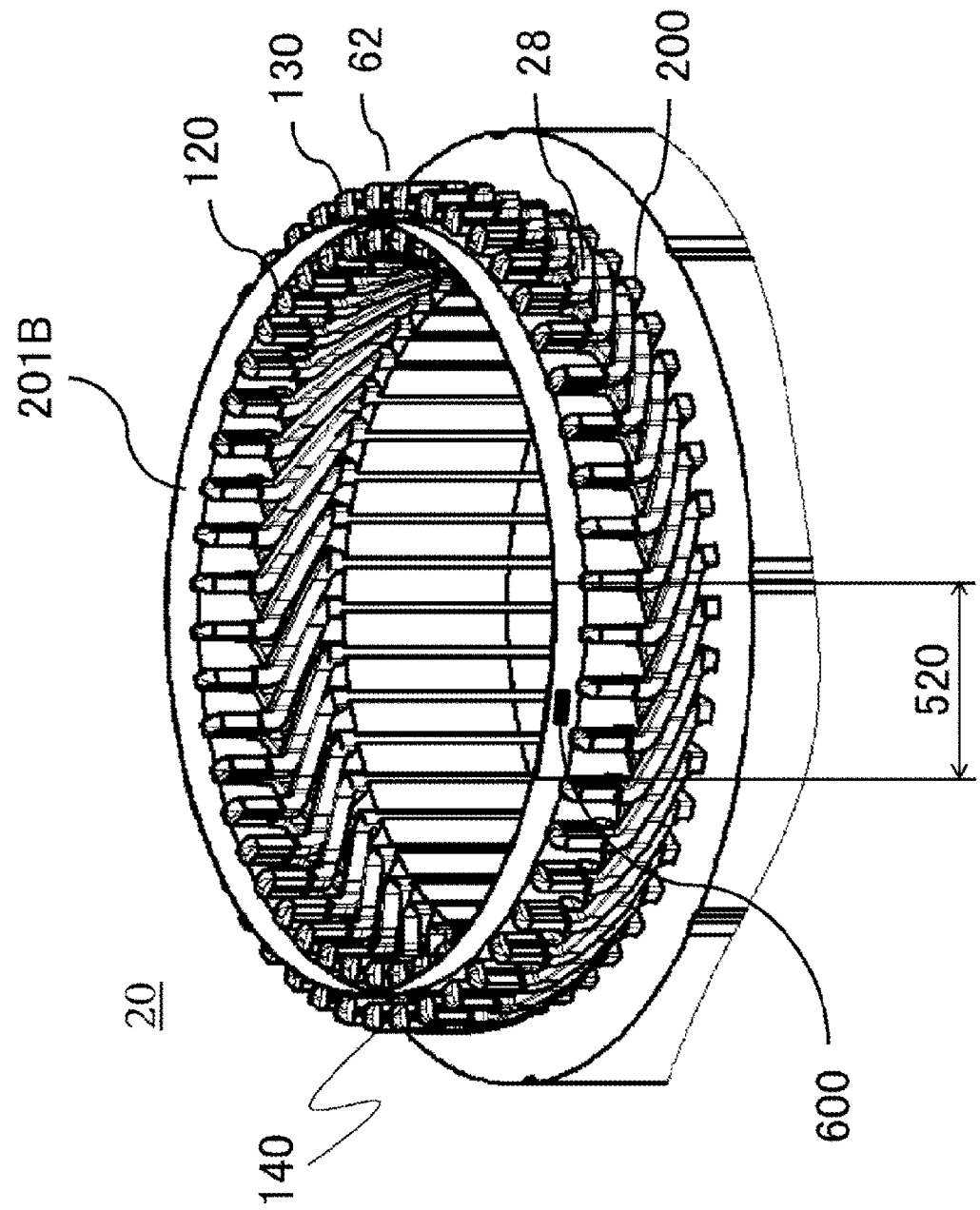

ROTARY ELECTRIC MACHINE AND METHOD OF MANUFACTURING ROTARY ELECTRIC MACHINE

TECHNICAL FIELD

The present invention relates to a rotary electric machine and a method of manufacturing a rotary electric machine.

BACKGROUND ART

In a stator of a rotary electric machine, it is necessary to prevent insulating paper that insulates between coil conductors from coming off. PTL 1 discloses a structure in which a convex portion is provided on at least one surface of insulating paper, and coil forming is performed along the convex portion to prevent the insulating paper from coming off. PTL 2 discloses a structure in which insulating paper is inserted during coil forming, forming processing and placement are performed, and then coil forming is performed again.

CITATION LIST

Patent Literature

PTL 1: JP 2012-34453 A
PTL 2: JP 2005-110492 A

SUMMARY OF INVENTION

Technical Problem

The technique described in PTL 1 has a problem that it requires a step of bending a convex portion after cutting the insulating paper, and the height of a coil end is increased by the height of the convex portion. The technique described in PTL 2, since a shape of the insulating paper is complicated, requires a step of forming and bending the insulating paper, further has a step of inserting the insulating paper in the middle of coil forming, and requires the coil forming again, and therefore, has a problem that the insulating paper already inserted is damaged, and sufficient insulating performance cannot be guaranteed.

Solution to Problem

The rotary electric machine according to the present invention includes insulating paper that is annularly arranged for use between segment conductors for insulation between the segment conductors at coil ends of the segment conductors that form stator windings of the rotary electric machine, and a developed shape of the annularly arranged insulating paper is a substantially fan shape.

The rotary electric machine according to the present invention includes an insulating paper that is annularly arranged for use between segment conductors for insulation between the segment conductors at coil ends of the segment conductors that form stator windings of the rotary electric machine, in which in the annularly arranged insulating paper, a circumference of an annular opening of the insulating paper on a tip side of the coil end is formed to be long, a circumference of an annular opening of the insulating paper on a stator end face side on an opposite side is formed to be short, and the insulating paper is formed to be inclined from the tip side of the coil end to the stator end face side with respect to an axial direction of the stator.

A method of manufacturing a rotary electric machine according to the present invention includes a step of punching the insulating paper that is annularly arranged for use from an insulating paper base material by press working.

Advantageous Effects of Invention

According to the present invention, it is possible to simplify the manufacturing process of the insulating paper, prevent the insulating paper from coming off, and eliminate the possibility of damaging the insulating paper.

BRIEF DESCRIPTION OF DRAWINGS

FIG. 15 is a perspective view showing a state where the insulating paper is fitted to the stator.

DESCRIPTION OF EMBODIMENTS

An embodiment of the present invention will be described with reference to FIGS. 1 to 15.

—Overall Configuration of Rotary Electric Machine—

Figure 1:
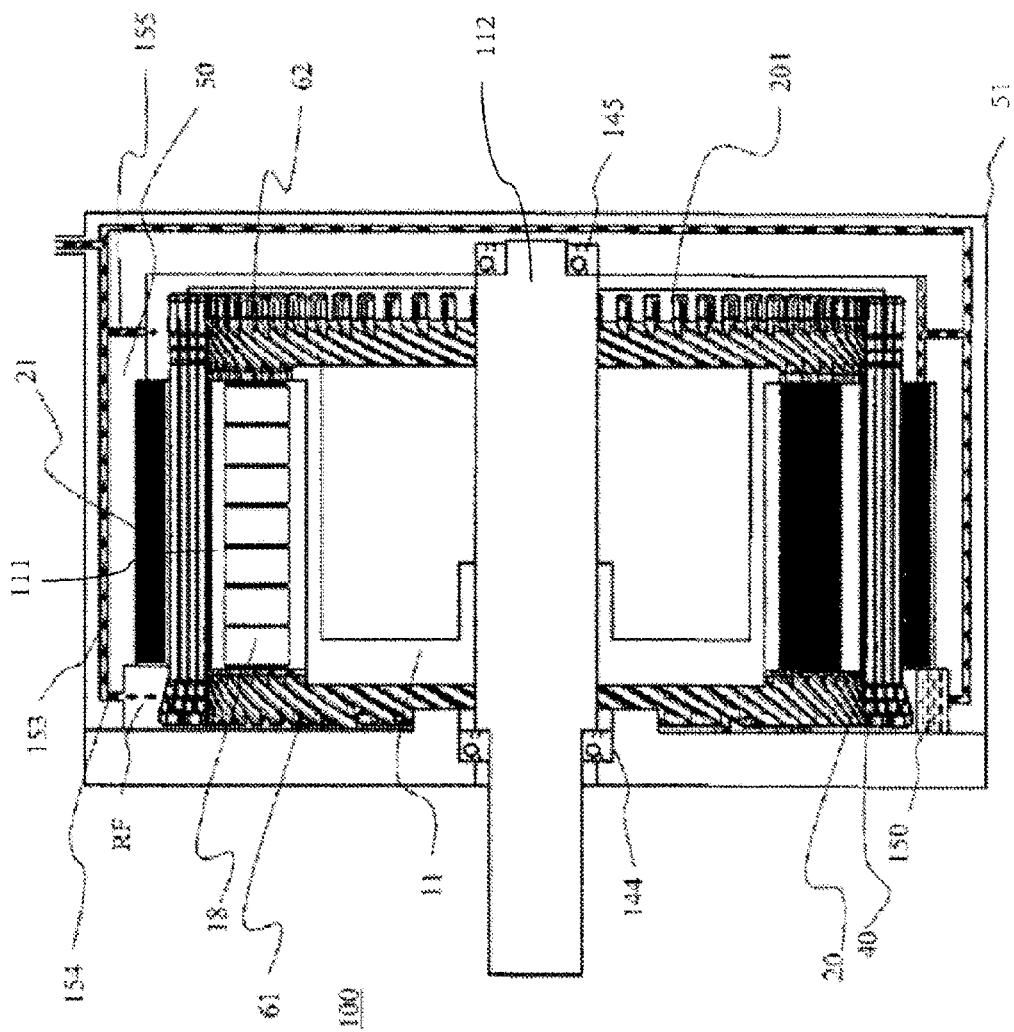
FIG. 1 is a cross-sectional view showing an internal structure of a rotary electric machine.

FIG. 1 is a cross-sectional view showing an internal structure of a rotary electric machine 100. A three-phase synchronous motor with a built-in permanent magnet, which is suitably used as a rotary electric machine 100 for a hybrid vehicle or an electric vehicle, will be described as an example. The rotary electric machine 100 includes a stator 20 and a rotor 11. The stator 20 includes a stator core 21 and a stator winding 40, and the rotor 11 includes a rotor core 111 and a rotary shaft 112. The rotary electric machine 100 operates as an electric motor when a three-phase alternating current is supplied to the stator winding 40, and when the rotary electric machine 100 is driven by an engine, operates as a generator to output three-phase AC generated power.

Figure 2:
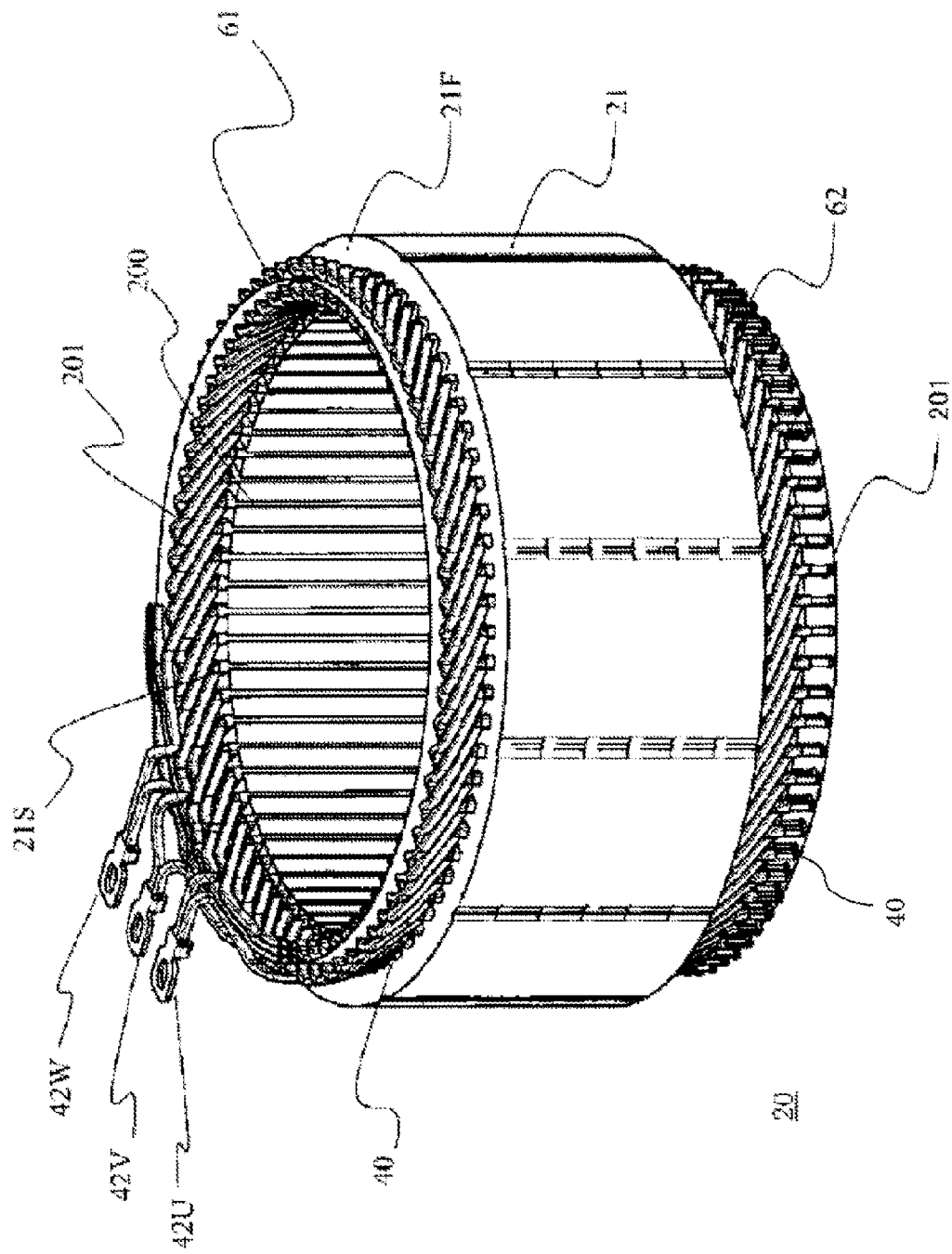
FIG. 2 is a perspective view of a stator of the rotary electric machine.

FIG. 2 shows an overall perspective view of the stator 20 of the rotary electric machine 100. The stator core 21 is formed by, for example, punching or etching an electromagnetic steel plate having a thickness of about 0.05 to 1 mm to form a laminated plate for the stator core (not shown), and laminating the laminated plates for the stator core. On the inner peripheral side of the laminated plate for the stator core, radial recesses and protrusions are formed at evenly spaced positions in the circumferential direction during the forming, and when the laminated plates for the stator core are laminated, the recesses are continuously arranged to form slots 21S.

As shown in FIG. 1, the rotor core 111 is manufactured by laminating thin silicon steel plates and is fixed to the rotary shaft 112. The rotor 11 has a built-in permanent magnet 18, and rotates at a predetermined position inside the stator 20 and at a position facing the stator 20.

The outer circumference of the stator 20 is fixed to the inner circumference of a housing 50, and the outer circumference of the housing 50 is fixed to the inner circumference of the case 51. The rotary shaft 112 is rotatably supported by bearings 144 and 145 attached to the case 130.

The rotary electric machine 100 is cooled by a refrigerant RF such as insulating oil. Therefore, a reservoir 150 of the refrigerant RF is formed at the bottom portion of the case 130, and the lower portion of the stator 20 is immersed in the refrigerant RF accumulated in the reservoir 150. The refrigerant RF accumulated in the reservoir 150 is sucked by a pump (not shown), and is discharged from refrigerant outlets 154 and 155 formed in the upper part of the case 130 via a refrigerant passage 153. In the rotary electric machine 100, the stator winding 40 is a main heat generating portion, and the generated heat is transferred to the case 130 via the stator core 21, and is radiated by the refrigerant RF flowing in the case 130.

When the rotary electric machine 100 is assembled, the stator 20 is inserted inside the housing 50 and attached to the inner peripheral wall thereof in advance, and then the rotor 11 is inserted into the stator 20. Next, the rotary shaft 112 mounted on the rotor 11 is assembled to the case 130 while being fitted into the bearings 144 and 145.

—Stator—

As shown in FIG. 2, the stator core 21 has three-phase stator windings 40 of U-phase, V-phase, and W-phase wound by distributed winding. On the inner circumference of the stator core 21, for example, 72 slots 21S extending parallel to the central axis thereof are formed at equal intervals in the circumferential direction, and the three-phase stator windings 40 of U-phase, V-phase, and W-phase are inserted into the slot 21S while being insulated by the slot liner 200. The slot liner 200 is arranged so as to enclose the stator winding 40 in order to prevent the stator winding 40 and the stator core 21 from approaching and short-circuiting.

Figure 3:
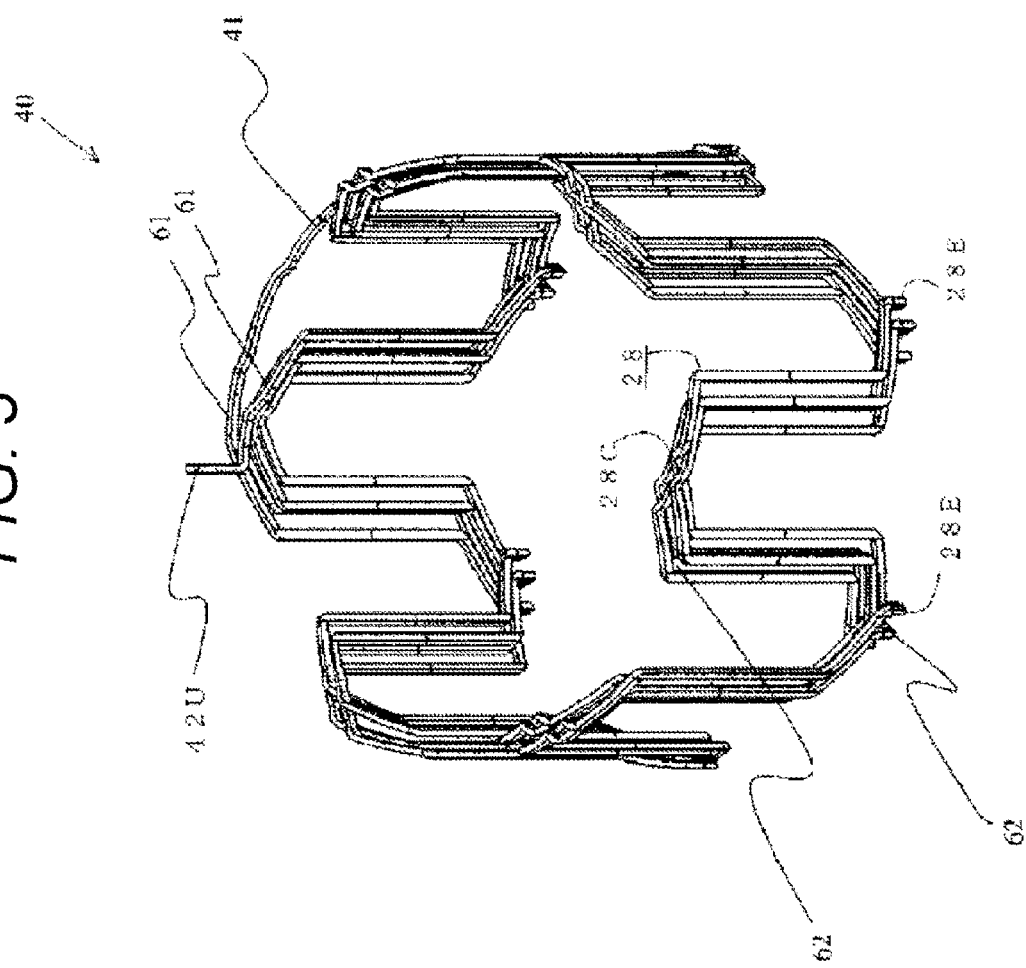
FIG. 3 is a perspective view showing a coil winding of the stator.

The rotary electric machine 100 is, for example, a 2Y motor having two systems of three-phase alternating current, and has a total of six U-phase, V-phase, and W-phase windings as shown in FIG. 3 described later.

As shown in FIG. 2, at one coil end 61 of the stator winding 40, six pieces of the UVW three-phase two-system input/output coil conductors 42U, 42V, and 42W are pulled out from six coil winding start end portions of each phase two-system. Further, six neutral point connection conductors 41 (see FIG. 3) are pulled out from six coil winding end portions of each phase two-system.

The insulating paper 201 is provided on the coil ends 61 and 62 between the coils of the three-phase stator winding 40. Details of the insulating paper 201 will be described later.

—Stator Winding—

Figure 4:
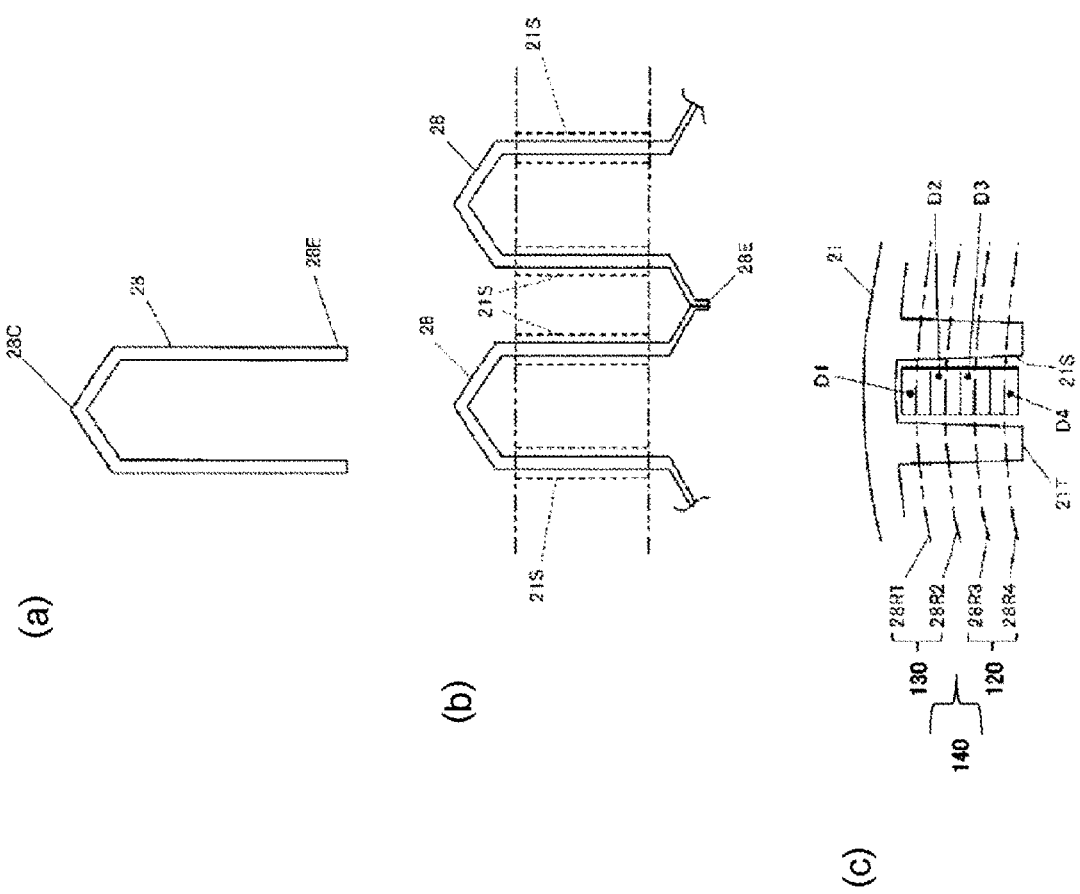
FIGS. 4(a), 4(b), and 4(c) are a unit diagram of a segment conductor forming the coil winding, a connection diagram of the segment conductors, and an array diagram of the segment conductors, respectively.

With reference to FIGS. 3 and 4, the stator winding 40 will be described in more detail. Although three-phase stator windings are provided in the present embodiment, in order to facilitate understanding, FIG. 3 shows the stator winding 40 of only one system of one phase, and the stator core 21 and the slot liner 200 are omitted.

FIG. 3 is a diagram for explaining the U-phase stator winding 40. The stator winding 40 is configured by using a plurality of segment conductors 28 formed in a substantially U shape as shown in FIG. 4(*a*) and welding end portions 28E. The stator winding 40 is wound as follows. The segment conductors 28 are inserted into 24 slots 21S assigned to the U-phase from one end face side of the stator core 21. The segment conductors 28 are inserted not every adjacent slot but every predetermined number of slots. As shown in FIG. 4(*b*), the end portions 28E of the segment conductors 28 are alternately bent, and the end portions 28E of the adjacent segment conductors 28 are welded to each other. As a result, the U-phase stator winding 40 of FIG. 3 is wound around the stator core 21. The rotary electric machine 100 of this embodiment is a 2Y motor, and windings of six systems in the entire UVW phase are closely attached to the stator core 21.

The segment conductor 28 is manufactured using, for example, a rectangular wire (coil conductor) having a rectangular cross section covered with an insulating coating. The rectangular wire is wound in each slot 21S such that the rectangular cross section of the segment conductor is long in the circumferential direction of the stator core 21 and short in the radial direction of the stator core 21. In the present embodiment, four segment conductors 28 are inserted in each slot 21S, as indicated by reference characters D1, D2, D3, D4 in FIG. 4(*c*). Therefore, in the stator winding 40, the rows of the segment conductors 28 arranged in the circumferential direction are arranged in four rows in the radial direction. Each of these rows is referred to as a first conductor row 28R1, a second conductor row 28R2, a third conductor row 28R3, and a fourth conductor row 28R4 in order from the outer diameter side.

In the following description, the coil windings that form the first conductor row 28R1 and the second conductor row 28R2 may be referred to as an outer peripheral coil 130, the coil windings that form the third conductor row 28R3 and the fourth conductor row 28R4 may be referred to as an inner peripheral coil 120, and a space between the conductor rows 28R2 and 28R3, which becomes a space between the outer peripheral coil 130 and the inner peripheral coil 120, may be referred to as an inter-coil gap 140.

—Assembling Step of Stator—

The above-described assembling step of the stator 20 of the rotary electric machine 100 will be described with reference to FIGS. 2, 3, and 4. The assembling step of the stator 20 includes a first step of protruding the segment conductor 28 from one coil end 61 side to the other coil end 62 side passing through the slot 21S, a second step of bending the end portion 28E of the segment conductor 28 protruding to the other coil end 62 side, a third step of welding the bent end portions 28E of the segment conductors 28, and a fourth step of inserting the insulating paper 201 into the inter-coil gap 140 (between the second to third conductor rows 28R2 to 28R3) of the segment conductors 28 protruding to the other coil end 62 side.

The outline of each assembling step of the stator 20 will be described below.

—Insertion Step of Slot Liner—

The insertion step of the slot liner 200 will be described with reference to FIGS. 5 and 6. A pair of slot liners 200 for the outer peripheral coil 130 and the inner peripheral coil 120 are inserted into the slot 21S. The slot liner 200 is divided into the one for an outer peripheral coil and the one for an inner peripheral coil. The slot liner 200 for the outer peripheral coil forms a surrounding space 200SG that collectively surrounds the segment conductors 28 of the first conductor row 28R1 and the second conductor row 28R2 among the four segment conductors 28 arranged in the depth direction of the slot 21S. The slot liner 200 for the inner peripheral coil forms a surrounding space 200SN that collectively surrounds the segment conductors 28 of the third conductor row 28R3 and the fourth conductor row 28R4 among the four segment conductors 28 arranged in the depth direction of the slot 21S.

—Coil Inserting Step—

The coil inserting step will be described with reference to FIGS. 5 and 6. The segment conductor 28 of the inner peripheral coil 120 is inserted into the surrounding space 200SN of the slot liner 200 for the inner peripheral coil, and the segment conductor 28 of the outer peripheral coil 130 is inserted into the surrounding space 200SG of the slot liner 200 for the outer peripheral coil. At this time, the straight portion of the end portion of the segment conductor 28 of the outer peripheral coil 130 and the straight portion of the segment conductor 28 of the inner peripheral coil 120 protrude from an end face 21F. In this way, in the slot 21S, the segment conductors 28 of the inner peripheral coil 120 and the outer peripheral coil 130 are surrounded by the slot liner 200 and insulated from the stator core 21. It should be noted that the insulating coatings on the tip portions of the segment conductors 28 of the inner peripheral coil 120 and the outer peripheral coil 130 are peeled off. Further, as shown in FIG. 6, in this state, the inter-coil gap 140 (between the second conductor row 28R2 and the third conductor row 28R3) exists in the same slot.

—Bending Step—

Figure 6:
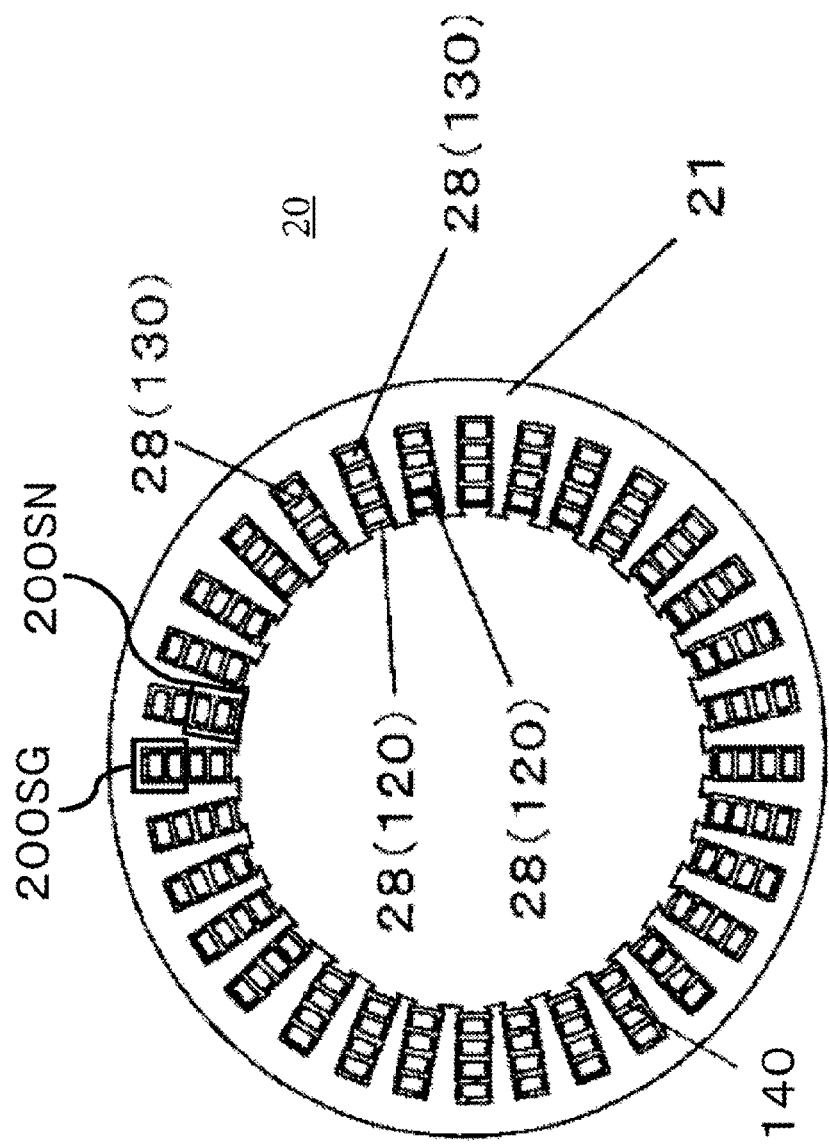
FIG. 6 is a layout drawing of segment conductors on the stator.
Figure 7:
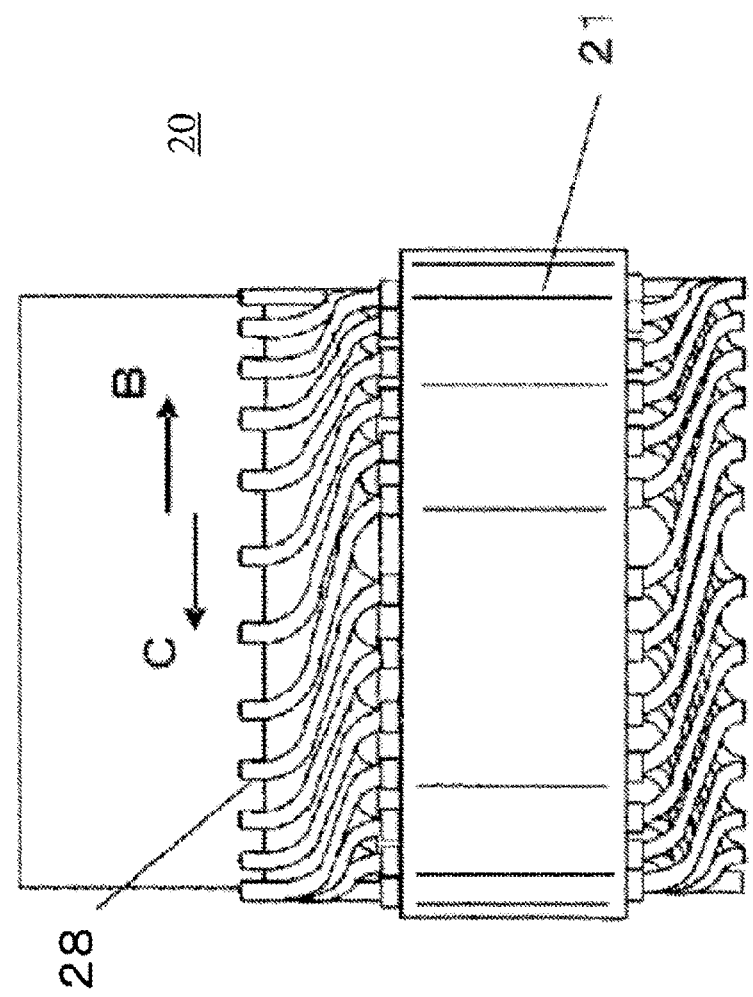
FIG. 7 is a process drawing of bending the segment conductors of the stator.

As shown in FIGS. 6 and 7, the tip portion on one side in the straight portion of the segment conductor 28 forming the inner peripheral coil 120 is gripped by a twisting mechanism (not shown), and the tip portion on one side in the straight portion of the segment conductor 28 forming the outer peripheral coil 130 is gripped by a twisting mechanism. Then, the stator core 21 is rotated in the first circumferential direction so that one side of the tip portion of the outer peripheral coil 130 and one side of the tip portion of the inner peripheral coil 120 are circumferentially (direction B in FIG. 7) twisted.

The tip portion on the other side in the straight portion of the segment conductor 28 forming the inner peripheral coil 120 is gripped by a twisting mechanism (not shown), and the tip portion on the other side in the straight portion of the segment conductor 28 forming the outer peripheral coil 130 is gripped by a twisting mechanism. Then, the stator core 21 is rotated in the second circumferential direction, and the other side of the tip portion of the outer peripheral coil 130 and the other side of the tip portion of the inner peripheral coil 120 are twisted in the other circumferential direction (direction C in FIG. 7). By the twisting of the tip portion by the twisting mechanism, the tip portion bending step of the inner peripheral coil 120 and the outer peripheral coil 130 is performed as shown in FIG. 7.

—Coil Insertion, Forming, End Face Welding—

Figure 5:
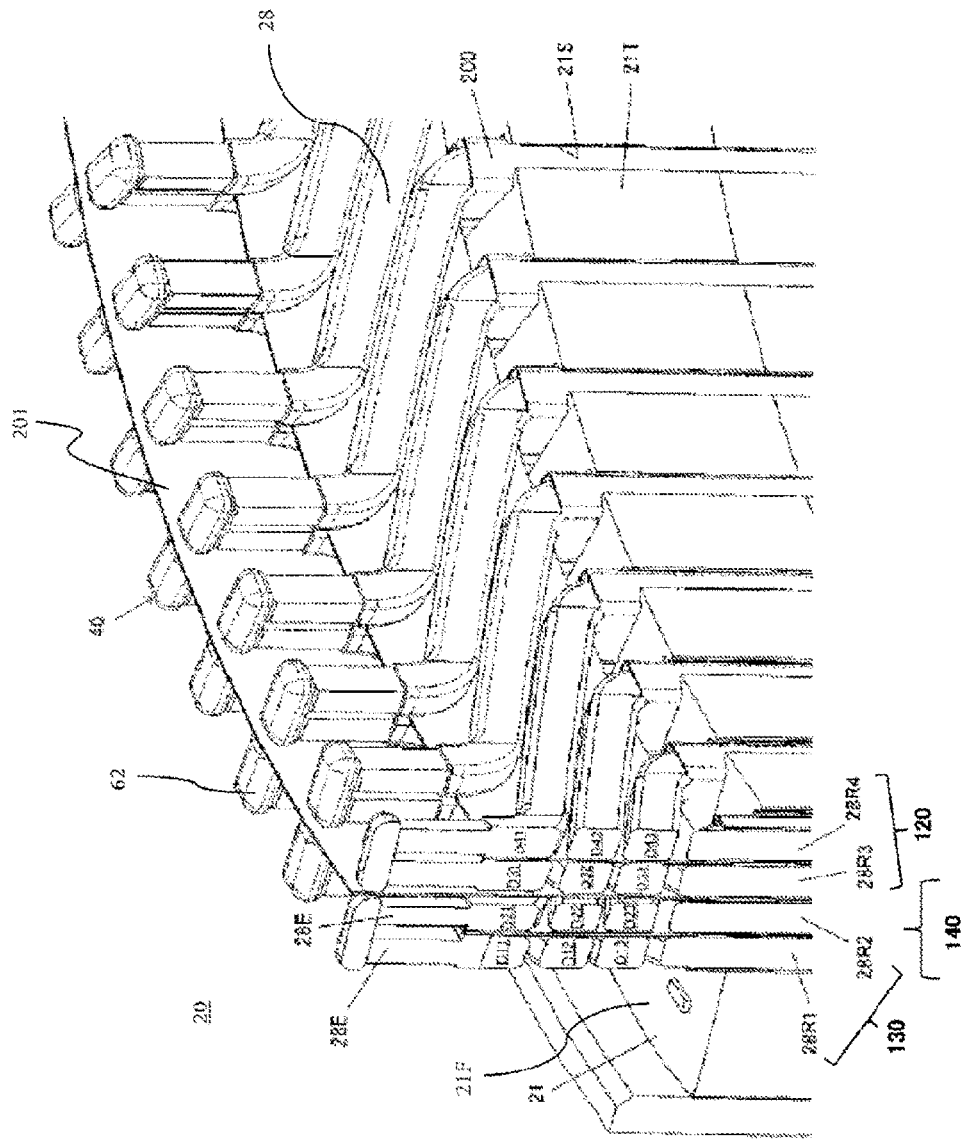
FIG. 5 is a partial cross-sectional view showing a coil winding of the stator.

As shown in FIGS. 3, 4(b), and 5, a plurality of U-shaped segment conductors 28 are inserted into the slots 21S from the coil end 61 side. Adjacent in-phase U-shaped segment conductors 28 have their end portions bent and formed in opposite directions on the coil end 62 side, and joined by fusing welding, TIG welding, or the like. As a result, one U-phase, V-phase, and W-phase two-system coil winding is wound around the stator core 21.

—Welding Step—

As shown in FIGS. 4(b) and 4(c), the end portions 28E adjacent to each other in the circumferential direction of the segment conductors 28 forming the outer peripheral coil 130, and the end portions 28E adjacent to each other in the circumferential direction of the segment conductors 28 forming the inner peripheral coil 120 are welded and joined by a welding device (not shown) in a state where they intersect each other.

—Insertion Step of Insulating Paper—

Figure 8:
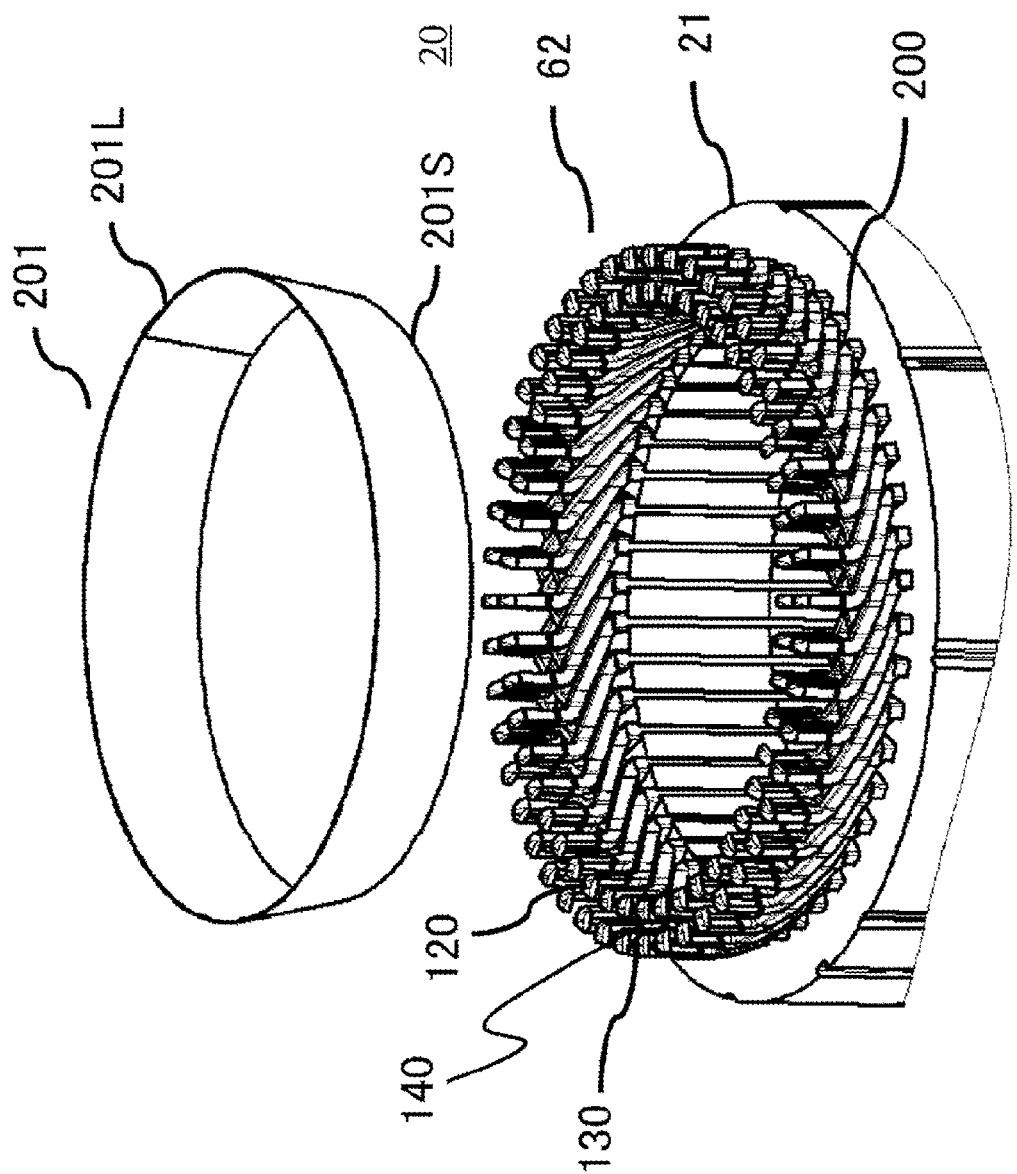
FIG. 8 is a perspective view showing a step of inserting insulating paper into the stator.

As shown in FIG. 8, after the coil forming and the welding and joining, the insulating paper 201 is inserted from the tip of the inter-coil gap 140 between the inner peripheral coil 120 and the outer peripheral coil 130 toward the end face side of the slot liner 200. At this time, the end face 201S on the small diameter side of the insulating paper 201, which is formed in an annular taper shape, is inserted toward the coil end 62 side until it abuts against the end face of the slot liner 200 between the inner peripheral coil 120 and the outer peripheral coil 130.

Through the above steps, the assembly of the stator 20 is completed.

—Insulating Paper Fitting Configuration—

With reference to FIGS. 5 and 8, the insulating paper, which is a feature of the present embodiment, will be described. FIG. 5 is a perspective view of the stator 20 of FIG. 2 as viewed from the coil end 62 side, and shows the stator winding 40 that is protruded from each slot 21S to the coil end 62 side and has its end portion welded.

In FIG. 5, the above-mentioned first conductor row 28R1 is formed by the three segment conductors 28 indicated by reference signs D11 to D13. The three segment conductors 28 protrude from different slots. The second conductor row 28R2 is formed by the three segment conductors 28 indicated by D21 to D23. The three segment conductors 28 protrude from different slots. The three segment conductors 28 indicated by D31 to D33 form the third conductor row 28R3. The three segment conductors 28 protrude from different slots. The three segment conductors 28 indicated by D41 to D43 form the fourth conductor row 28R4.

The three segment conductors 28 protrude from different slots.

As shown in FIG. 5, the insulating paper 201 formed of an insulating material or the like is provided between the second conductor row 28R2 and the third conductor row 28R3. The insulating paper 201 is inserted between the second conductor row 28R2 and the third conductor row 28R3 after the coil forming and the welding and joining for performing the bending process of the segment conductor 28 described later, and the insulating paper 201 itself has a structure and function that does not come off the coil end.

—Fitting of Insulating Paper—

Figure 9:
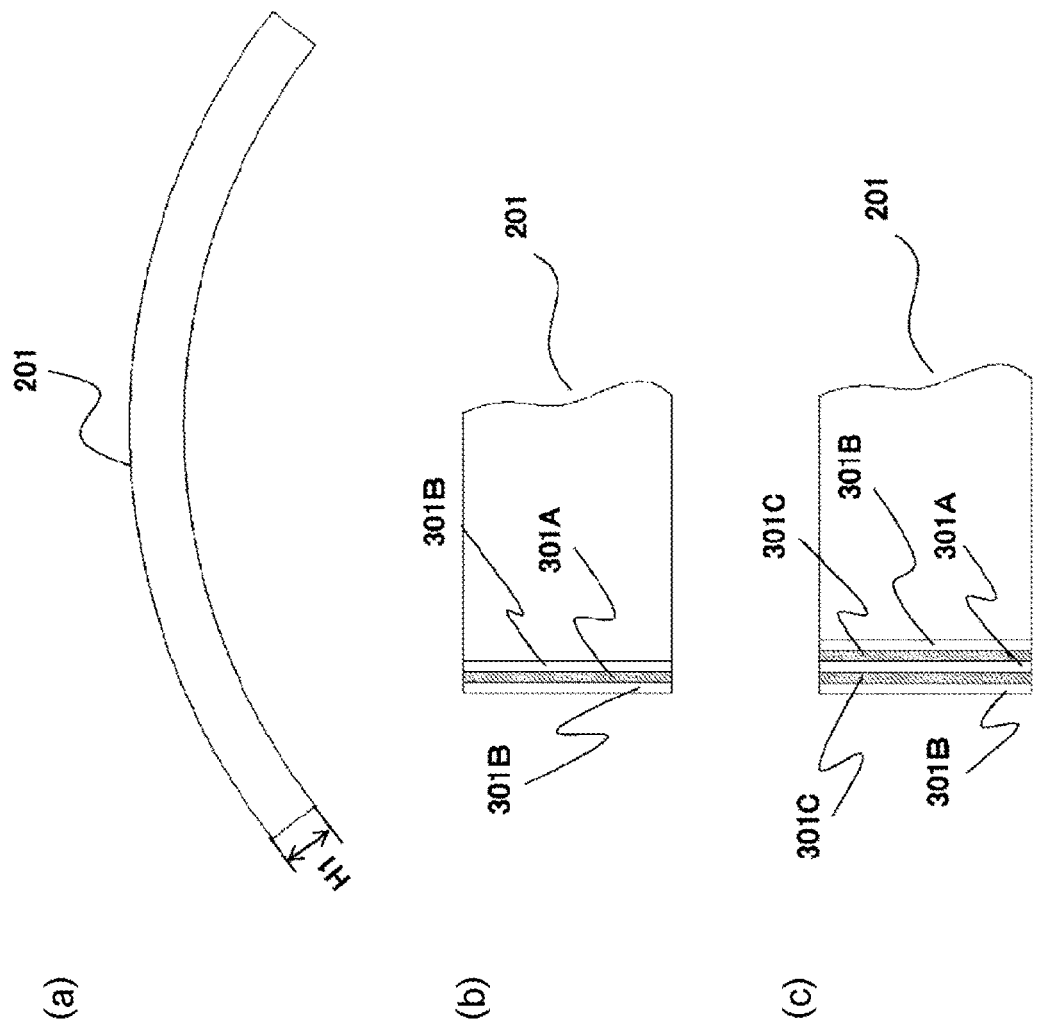
FIGS. 9(a), 9(b), and 9(c) are a front view showing a punching shape of an insulating paper material of a first embodiment, and cross-sectional views showing the insulating paper.
Figure 10:
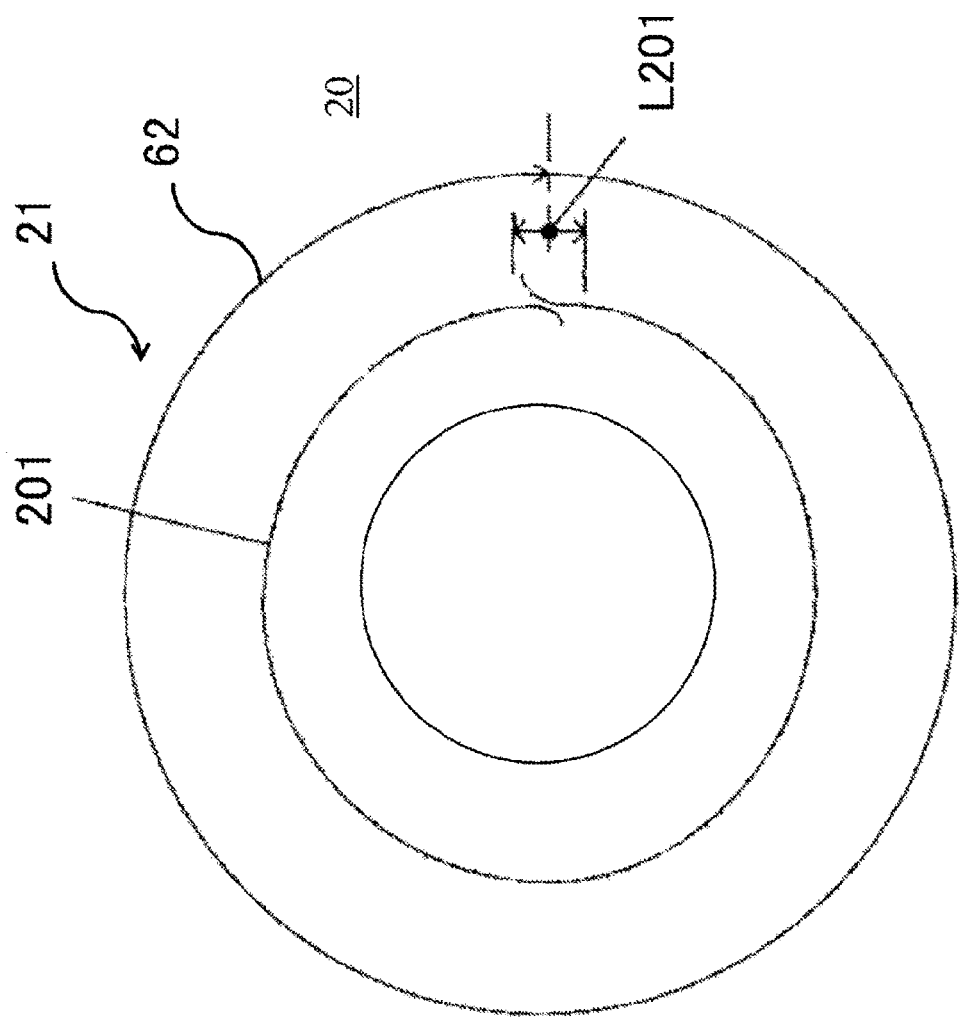
FIG. 10 is a layout drawing after inserting the insulating paper into the stator.
Figure 11:
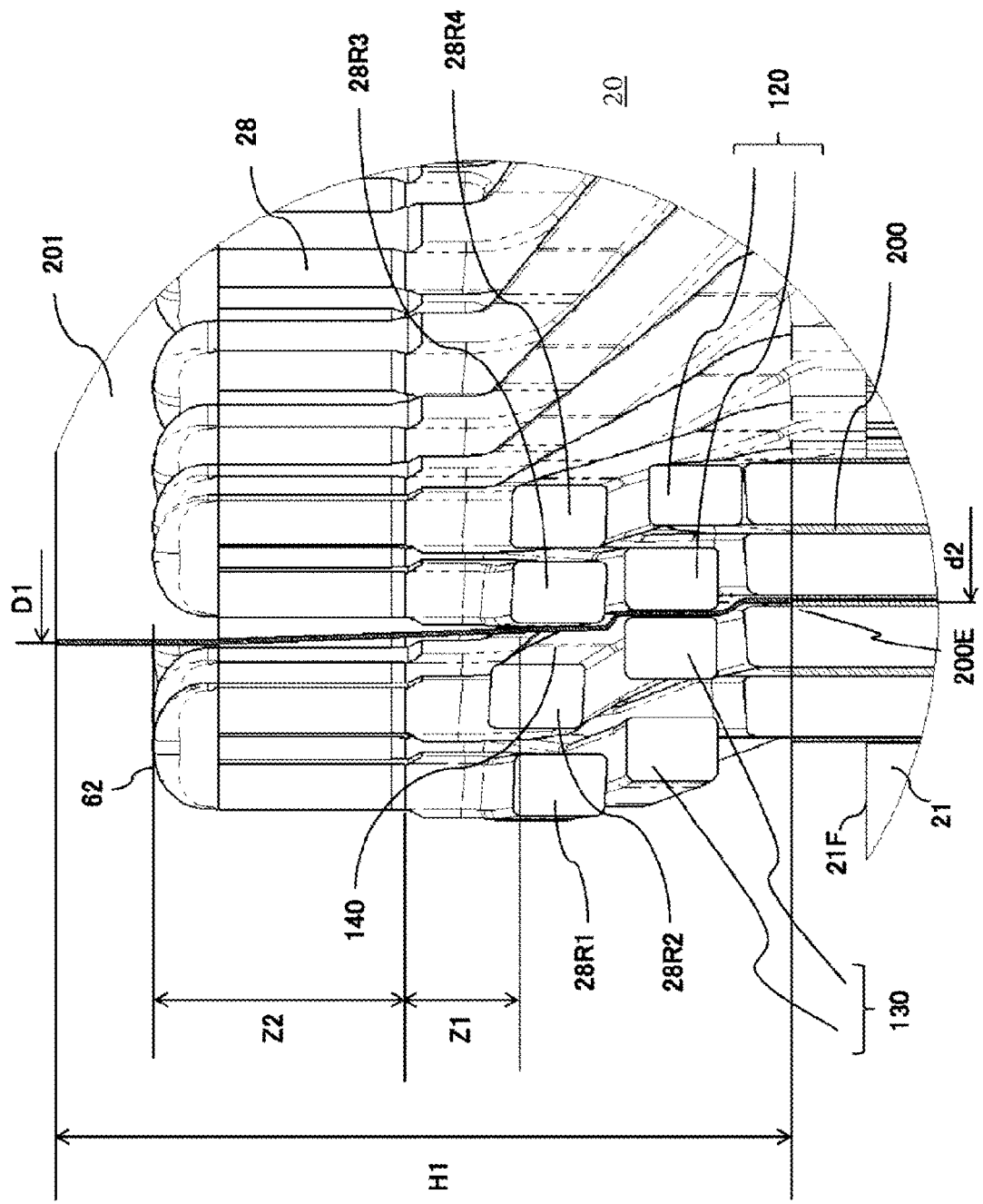
FIG. 11 is a detailed view after inserting the insulating paper into the stator.
Figure 12:
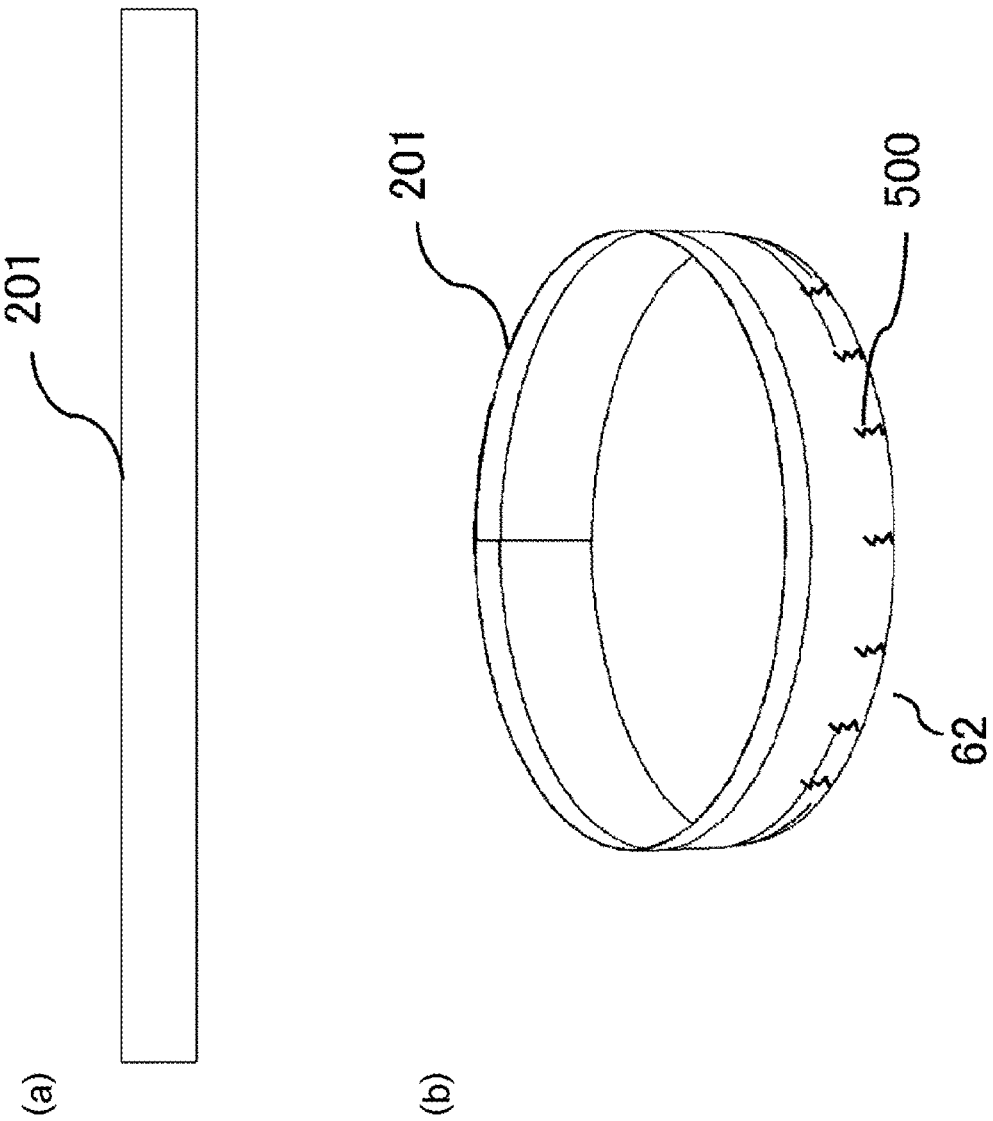
FIGS. 12(a) and 12(b) are a front view and a perspective view showing a punching shape of a conventional insulating paper material, respectively.

The insulating paper 201 will be described with reference to FIGS. 9, 10, and 11. FIG. 9(a) is a developed view of the material punching shape of the insulating paper, and FIG. 10 is a plan view of the stator 20 as seen from the coil end 62, showing the mounting position of the insulating paper 201. FIG. 11 is a detailed view after inserting the insulating paper into the stator.

As shown in FIGS. 9(a), 10, and 11, the insulating paper 201 has a fan shape having a height H1 and also having a length capable of insulating the inter-coil gap 140 between the inner peripheral coil 120 and the outer peripheral coil 130 over the entire circumference. Explaining with reference to FIGS. 9(a) and 11, the insulating paper 201 is disposed in the inter-coil gap 140. The insulating paper 201 is in contact with the end face of the slot liner 200 and rises at the height H1 in the tip direction of the inner peripheral coil 120 and the outer peripheral coil 130. In FIG. 10, the length of the insulating paper 201 is based on a total length of the perimeter of the inter-coil gap 140 between the inner peripheral coil 120 and the outer peripheral coil 130 and an end portion overlap margin L201 or more.

The insulating paper 201 shown in FIG. 11 protrudes outward in the axial direction of the coil end 62. This ensures the insulation between the second conductor row 28R2 and the third conductor row 28R3, and also secures the creepage distance as an insulating material.

As shown in FIG. 11, the insulating coating is peeled off at a height dimension Z2 of the segment conductor 28 on the coil end 62 side. Therefore, the height dimension H1 of the insulating paper 201 makes it possible to ensure the insulation between the second conductor row 28R2 and the third conductor row 28R3 by setting the inter-coil gap 140 between the inner peripheral coil 120 and the outer peripheral coil 130 to the minimum creepage distance Z1 or more. Further, in the example of FIG. 11, since the insulating paper 201 is disposed so as to abut against the end face of the slot liner 200, there is no gap in the insulating paper on the coil end 62 side, and it is possible to reliably ensure insulation reliability.

With respect to setting of the thickness of the insulating paper 201, a fixing force is smaller as the space gap is larger than the inter-coil gap 140, and the fixing force of the insulating paper 201 is increased as the space gap becomes smaller. Therefore, by setting an appropriate material thickness of the insulating paper 201, it is possible to adjust the workability of inserting the insulating paper 201 into the inter-coil gap 140 and the fixing force of the insulating paper 201.

As shown in FIG. 11, a fitting state of the insulating paper 201 into the inter-coil gap has an annular taper shape in which a diameter dimension D1 of an annular opening of the insulating paper 201 on a coil end tip side is long, and a diameter dimension d2 of an annular opening of the insulating paper 201 on a stator end face side on the opposite side is short. In other words, the circumference of the annular opening of the insulating paper 201 on the coil end tip side is formed to be long, and the circumference of the annular opening of the insulating paper 201 on the stator end face side on the opposite side is formed to be short.

Then, the insulating paper 201 is made to follow the tapered shape of the inter-coil gap 140 between the inner peripheral coil 120 and the outer peripheral coil 130, and the insulating paper 201 is fitted in a state inclined from the coil end tip side to the stator end face side with respect to the axial direction of the stator 20.

Therefore, bending after the insertion of the insulating paper 201 is reduced, the force of the insulating paper 201 trying to come off to the coil end tip side is suppressed, and it is possible to obtain the effect of preventing the floating and the coming off of the insulating paper 201.

—Shape and Material of Insulating Paper of First Embodiment—

The first embodiment of the material punching shape of the insulating paper 201 is shown in FIG. 9(a). As shown in FIG. 9(a), the developed shape of the material punching shape of the insulating paper 201 is a substantially fan shape. That is, the insulating paper 201 has a substantially fan shape in which R (radius) on the inner diameter side is small and R on the outer diameter side is large, and is formed by punching the insulating paper base material in one step by press working. Further, the circumference side defined by R (radius) on the inner diameter side or the circumference side defined by R on the outer diameter side may be connected by a straight line and a broken line to have a substantially fan shape. As described above, the developed shape of the insulating paper 201 is formed into a substantially fan shape so that when the insulating paper 201 is annularly arranged for use between the segment conductors for insulation between the segment conductors of the rotary electric machine, bending after the insertion of the insulating paper 201 is reduced, the force of the insulating paper 201 trying to come off to the coil end tip side is suppressed, and it is possible to obtain the effect of preventing the floating and the coming off of the insulating paper 201.

As described above, since the material punching step is only one step of punching into a fan shape, it is the same as the conventional one step of band-shaped punching, and the component manufacturing cost can be suppressed. The punching step is performed by press working or the like. The detailed shape of the insulating paper when fitted will be described below.

The material of the insulating paper 201 can be manufactured by thermoforming insulating paper 301B on the front and back surfaces of a plastic sheet 301A, as in the example shown in FIG. 9(b). Therefore, the insulating paper 201 has sufficient insulation, heat resistance, and chemical resistance. Further, as in the example shown in FIG. 9(c), by including a foaming agent 301C, it is possible to improve the function of preventing the insulating paper disposed between the coils from coming off and the hardening of the holding force due to vibration or the like. That is, the rotary electric machine is manufactured by a step of heating the insulating paper 201, foaming, and hardening after annularly arranging the insulating paper 201 between the segment conductors. Further, even if it is not the material of the insulating paper 201 as described in the present embodiment, by using an insulator such as paper or resin, it can be applied to the rotary electric machine other than the high output, high voltage, rotary electric machine. The material is not limited to those described in the present embodiment, and similar effects can be obtained.

—Comparison with Insulating Paper Having a Conventional Shape—

FIGS. 12(a) and 12(b) show a shape figure when the above-described insulating paper 201 having a conventional shape is inserted into the inter-coil gap 140 between the inner peripheral coil 120 and the outer peripheral coil 130. As shown in FIGS. 12(a) and 12(b), when the conventional band-shaped developed shape is made into an annular shape and the insulating paper is inserted into the inter-coil gap 140 between the inner peripheral coil 120 and the outer peripheral coil 130, the insulating paper is tightly inserted with respect to the coil end 62 side taper, and a bent portion 500 is generated. The bent portion 500 has a spring force and generates a force of the original shape without bending, and thereby the insulating paper 201 floats and comes off.

Figure 13:
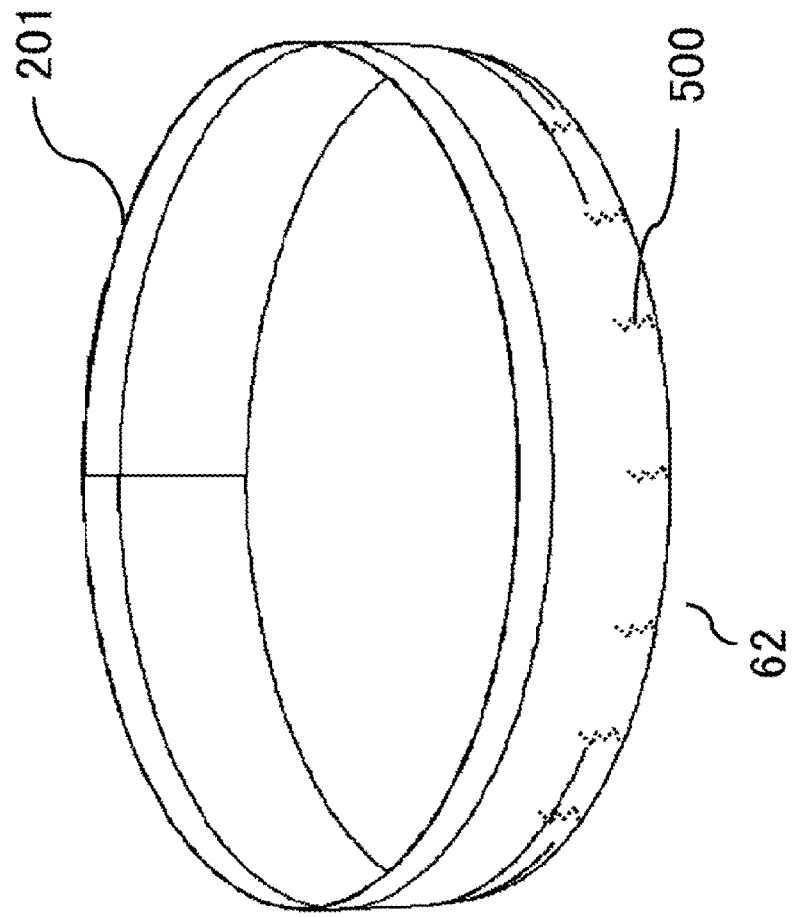
FIG. 13 is a perspective view when the insulating paper according to the first embodiment is inserted into the stator.

Therefore, as in the first embodiment shown in FIGS. 9(a), 11, and 13, when the fan-shaped developed shape is formed into an annular shape and the insulating paper is inserted between the inner peripheral coil 120 and the outer peripheral coil 130, the insulating paper is not tightly inserted with respect to the coil end 62 side taper, and the generation of the bent portion 500 is reduced, so that the spring force can be reduced and the insulating paper 201 can be prevented from floating and coming off.

The rotary electric machine 100 described above includes the insulating paper 201 annularly arranged for use in order to insulate the coils between the inner peripheral coil 120 and the outer peripheral coil 130 at the coil end 62 of the segment conductor 28 having the stator 20 and the rotor 11. Further, the punching shape of the insulating paper material of the annularly arranged insulating paper 201 is a fan shape, and the shape when the insulating paper, which is disposed in an annular taper shape in the inter-coil gap 140, is fitted is formed into an annular taper shape in which the diameter dimension D1 on the coil end tip side is wide, and the diameter dimension d2 on the stator end face side is narrow. Thereby, it is possible to follow the taper shape between the inner peripheral coil 120 and the outer peripheral coil 130, reduce the bent portion 500 after the insertion of insulating paper, suppress the force of the insulating paper 201 trying to come off, and obtain the effect of preventing the floating and the coming off of the insulating paper 201.

According to this embodiment, the following operational effects can be obtained.

(1) In the coil end 62, by inserting the annular insulating paper 201 into the inter-coil gap 140 between the inner peripheral coil 120 and the outer peripheral coil 130, it is possible to prevent insulation failure between the inner peripheral coil 120 and the outer peripheral coil 130 at the coil end 62 in the high output, high voltage rotary electric machine.

(2) The shape of the insulating paper 201 annularly arranged in the inter-coil gap 140 when it is fitted is formed into an annular taper shape in which the diameter dimension D1 on the coil end tip side is wide and the diameter dimension d2 on the stator end face side is narrow. Thereby, it is possible to follow the taper shape of the inter-coil gap 140 between the inner peripheral coil 120 and the outer peripheral coil 130, reduce bending after the insertion of insulating paper 201, suppress the force of the insulating paper 201 trying to come off, and obtain the effect of preventing the floating and the coming off of the insulating paper 201.

(3) No separate member is required to prevent the insulating paper 201 from floating.

(4) In the method of manufacturing the rotary electric machine 100, the segment conductors 28 are inserted into the slots 21S, their end portions are bent and formed in mutually opposite directions on the coil end 62 side and joined by fusing welding, TIG welding, or the like, and then, the insulating paper 201 may be inserted. Since a separate step for preventing the floating of the insulating paper 201 is not required, the manufacturing step of the stator 20 does not become complicated.

(5) Since the insulating paper 201 is inserted after the coil forming and the welding and joining, the insulating coating portion of the coil is not damaged.

(6) Since the effect of preventing the insulating paper 201, which is disposed in the inter-coil gap 140, from coming off can be obtained only by the material punching shape of the insulating paper 201, it is possible to expect the effect of simplifying the manufacturing step of the insulating paper 201 and reducing the component manufacturing cost.

(7) Since the insulating paper 201 can be fitted into the inter-coil gap 140 after coil forming, welding, and joining, the possibility of damaging the insulating paper 201 can be suppressed, and the effect of improving insulation reliability can be expected.

(8) By using foamed insulating paper as the material of the insulating paper material, it is possible to further enhance the effect of preventing the insulating paper 201 from coming off.

—Insulating Paper Shape and Coil-to-Coil Fitting of Second Embodiment—

Figure 14:
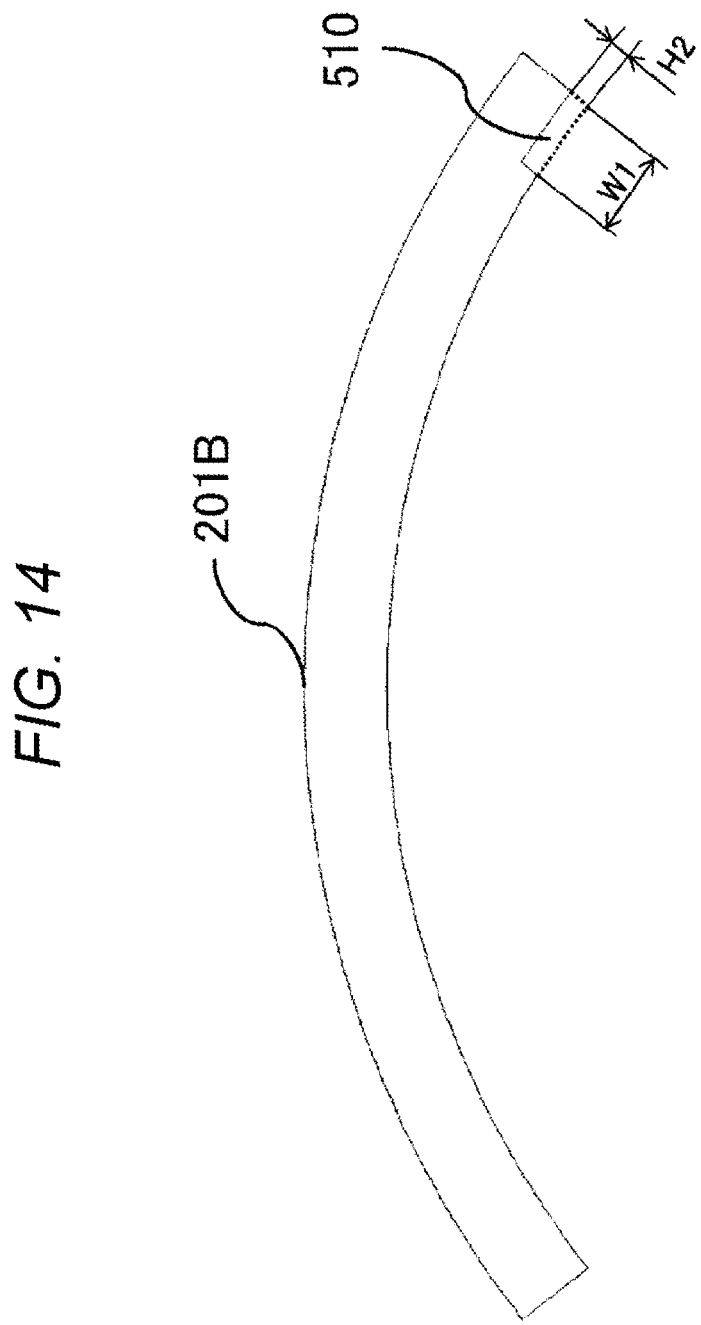
FIG. 14 is a front view showing a punching shape of insulating paper material according to a second embodiment.

FIG. 14 shows insulating paper developed shape obtained by punching out the insulating paper material of the second embodiment by press working or the like. As shown in FIG. 14, a notch portion 510 is provided at the end portion of insulating paper 201B on the stator end face side. The notch portion 510 is provided to eliminate the thickness of the overlapping portion of the insulating paper 201 on the stator end face side when the insulating paper 201 is annularly arranged between the segment conductors. A height direction H2 of the notch portion 510 is set to the minimum creepage distance or more between the inner peripheral coil 120 and the outer peripheral coil 130 from the height Z2 at which the insulating coating of the segment conductor 28 is peeled off, as shown in FIGS. 10, 11, and 14. This ensures the insulation between the second conductor row 28R2 and the third conductor row 28R3.

Further, the width direction W1 of the notch portion 510 is set based on a length equal to or more than the end portion overlap margin L201 of the insulating paper 201B disposed in the inter-coil gap 140 between the inner peripheral coil 120 and the outer peripheral coil 130. As a result, when the insulating paper 201B is inserted into the slot liner 200 side, it is possible to insert the insulating paper 201B in the entire circumference of the inter-coil gap 140 with the thickness of one sheet of insulating paper 201B without being overlappingly arranged with the thickness of two sheets of insulating paper 201B on the end portion side of the slot liner 200 where the inter-coil gap 140 between the inner peripheral coil 120 and the outer peripheral coil 130 becomes narrower. The insertability of the insulating paper 201B is improved, and it is possible to push the insulating paper 201B to the end portion of the slot liner 200 without applying force.

In this embodiment, in addition to the effect of the first embodiment, the effect and action of improving the insertability of the insulating paper 201B are exhibited.

—Insulating Paper Shape and Coil-to-Coil Fitting of Third Embodiment—

In contrast to the first and second embodiments, in this embodiment, as shown in FIGS. 11 and 15, the insulating paper 201B is inserted into the inter-coil gap 140 between the inner peripheral coil 120 and the outer peripheral coil 130, and pushed into the end portion side of the slot liner 200. After that, on the coil end 62 side of the segment conductor 28 of the insulating paper 201B, a fixing portion 600 joined by ultrasonic bonding, caulking, or the like is provided on an overlapped portion 520 of the insulating paper 201 on the end face side joined by fusing welding, TIG welding, or the like. This makes it possible to eliminate the spring force which tries to make the insulating paper 201B return to the fan-shaped developed shape, and obtain the effect of completely suppressing the floating and coming off of the insulating paper 201B by maintaining the annular taper shape. The fixing portion 600 may be fixed not only by joining but by fixing the overlapped portion 520 of the insulating paper 201 with an adhesive or other member.

In this embodiment, in addition to the effects of the first and second embodiments, the effect and action capable of completely suppressing the floating and coming off of the insulating paper 201B are exhibited.

—Insulating Paper Shape and Coil-to-Coil Fitting of Fourth Embodiment—

In contrast to the first, second, and the third embodiments described above, in the present embodiment, as shown in FIG. 15, the insulating paper 201B on the coil end 62 side is used as a funnel, and varnish is poured and made to penetrate into the gap between the inner peripheral coil 120 and the outer peripheral coil 130 and into the gap of the insulating paper 201B to fix the insulating paper 201B.

In the present embodiment, in addition to the effects of the first, second, and third embodiments, the effect and action of further improving the effect of preventing floating and coming off of the insulating paper 201B are exhibited.

—Other Modifications—

The insulating paper 201B material used in each of the embodiments described above can be replaced by using an insulator such as general paper, resin, or rubber material having insulation property. For the material, the present invention is not limited to those described in the present embodiment, and the present configuration can be applied as long as the same effect can be obtained.

Further, the present configuration can also be applied to the rotary electric machine other than the rotary electric machine of high output and high voltage, and the present invention can also be applied to an outer rotor type rotary electric machine.

As described above, according to the present embodiment, since it is possible to obtain the effect of preventing the insulating paper from coming off, which is disposed between the coils only by the material punching shape of the insulating paper, it is possible to expect the effect of simplifying the manufacturing process of the insulating paper, and reducing the component manufacturing cost. In addition, the shape of the insulating paper, which is annularly arranged between coils, when the insulating paper is fitted is formed into an annular taper shape in which a diameter dimension on the coil end tip side is wide and a diameter dimension on the stator end face side is narrow, so that it is possible to obtain the effect of preventing the insulating paper from coming off by inserting and arranging according to the formed shape of the stator coil. Further, fitting of the present insulating paper between the coils can be performed after the coil forming, so that the possibility of damaging the insulating paper can be suppressed, and an effect of improving insulation reliability can be expected. Further, by providing a notch at the inner diameter side end portion of the fan-shaped punching shape of the insulating paper material, the effect of improving insertability of the insulating paper between the coils can be further improved, and by using foamed insulating paper as the material of the insulating paper material, the effect of preventing the insulating paper from coming off can be further improved.

According to the embodiments described above, the following operational effects can be obtained.

(1) The rotary electric machine 100 includes the insulating paper 201 that is annularly arranged for use between the segment conductors 28 for insulation between the segment conductors at the coil ends of the segment conductors 28 that form the stator windings 40 of the rotary electric machine 100. The developed shape of the annularly arranged insulating paper 201 is a substantially fan shape. This simplifies the manufacturing step of the insulating paper, prevents the insulating paper from coming off, and eliminates the possibility of damaging the insulating paper.

(2) The rotary electric machine 100 includes insulating paper 201 which is annularly arranged for use between the segment conductors 28 for insulation between the segment conductors at the coil ends of the segment conductors 28 forming the stator winding 40 of the rotary electric machine 100. In the annularly arranged insulating paper 201, a circumference of an annular opening of the insulating paper 201 on the tip side of the coil end is formed to be long, a circumference of an annular opening of the insulating paper 201 on the stator end face side on the opposite side is formed to be short, and the insulating paper 201 is formed to be inclined from the tip side of the coil end to the stator end face side with respect to an axial direction of the stator 20.

This simplifies the manufacturing step of the insulating paper, prevents the insulating paper from coming off, and eliminates the possibility of damaging the insulating paper.

(3) The method of manufacturing a rotary electric machine includes a step of punching the insulating paper 201, which is annularly arranged for use, from the insulating paper base material by press working. This simplifies the manufacturing step of the insulating paper, and suppresses the component manufacturing cost.

The present invention is not limited to the above-mentioned embodiments, and other forms conceivable within the scope of the technical idea of the present invention are also included in the scope of the present invention as long as the characteristics of the present invention are not impaired. Further, the above-mentioned embodiments may be combined.

REFERENCE SIGNS LIST 11 rotor
18 permanent magnet
20 stator
21 stator core
21F end face
21S slot
28 segment conductor
28E end portion
28R1 first conductor row
28R2 second conductor row
28R3 third conductor row
28R4 fourth conductor row
40 stator winding
41 neutral point connection conductor
42U coil conductor
42V coil conductor
42W coil conductor
50 housing
51 case
61 coil end
62 coil end
100 rotary electric machine
111 rotor core
112 rotary shaft
120 inner peripheral coil
130 outer peripheral coil
140 inter-coil gap
144 bearing
145 bearing
150 reservoir 153 refrigerant passage
154 refrigerant outlet
155 refrigerant outlet
200 slot liner
200SG surrounding space
200SN surrounding space
201 insulating paper
201B insulating paper
201S end face on the small diameter side
L201 end portion overlap margin
301C foaming agent
500 bent portion
510 notch
520 overlapping portion of insulating paper
600 fixing portion
D1 diameter dimension on the coil end tip side
d2 diameter dimension on the stator end face side
H1 height
H2 height direction
W1 width direction
RF refrigerant

The invention claimed is:

1. A rotary electric machine comprising insulating paper that is arranged in an annular shape for use between segment conductors for insulation between the segment conductors at coil ends of the segment conductors that form stator windings of the rotary electric machine, a developed shape of the insulating paper being a substantially fan shape, wherein
in the insulating paper arranged in the annular shape, a circumference of an annular opening of the insulating paper on a tip side of the coil end is formed to be long, a circumference of an annular opening of the insulating paper on a stator end face side on an opposite side is formed to be short, the insulating paper is formed to be inclined from the tip side of the coil end to the stator end face side with respect to an axial direction of the stator, and the insulating paper has a notch at an end portion on the stator end face side; and
a thickness of the insulating paper on the stator end face is equal to or less than one sheet thereof.

2. A method of manufacturing the rotary electric machine according to claim 1, the method comprising
a step of punching the insulating paper that is arranged in the annular shape for use from an insulating paper base material by press working.

3. A method of manufacturing the rotary electric machine according to claim 1, the method comprising
a step of arranging the insulating paper in the annular shape between the segment conductors after disposing the segment conductors.

4. The method of manufacturing the rotary electric machine according to claim 3, the method comprising a step of fixing an overlapping portion of the insulating paper arranged in the annular shape after arranging the insulating paper in the annular shape between the segment conductors.

5. The method of manufacturing the rotary electric machine according to claim 3,
the insulating paper containing a foaming agent, and the method comprising a step of heating, foaming, and hardening the insulating paper after arranging the insulating paper in the annular shape between the segment conductors.

6. The method of manufacturing the rotary electric machine according to claim 3, the method comprising a step of fixing a gap between the insulating paper and the segment conductors by varnish penetration after arranging the insulating paper in the annular shape between the segment conductors.

* * * * *